US008913748B2

(12) United States Patent
Ho et al.

(10) Patent No.: US 8,913,748 B2
(45) Date of Patent: Dec. 16, 2014

(54) METHODS TO IMPROVE BLUETOOTH LOW ENERGY PERFORMANCE

(75) Inventors: Jin-Meng Ho, Plano, TX (US); Ariton E. Xhafa, Plano, TX (US); Gangadhar Burra, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 180 days.

(21) Appl. No.: 13/541,563

(22) Filed: Jul. 3, 2012

(65) Prior Publication Data

US 2013/0010960 A1 Jan. 10, 2013

Related U.S. Application Data

(60) Provisional application No. 61/504,613, filed on Jul. 5, 2011.

(51) Int. Cl.

| | |
|---|---|
| ***H04W 80/00*** | (2009.01) |
| ***H04L 29/06*** | (2006.01) |
| ***H04L 9/06*** | (2006.01) |
| ***H04W 52/02*** | (2009.01) |
| *H04W 28/06* | (2009.01) |

(52) U.S. Cl.

CPC ......... *H04L 9/0637* (2013.01); *H04W 52/0229* (2013.01); *H04W 80/00* (2013.01); *H04W 28/06* (2013.01); *H04L 2209/80* (2013.01)

USPC ............ 380/270; 370/310; 713/151; 713/160

(58) Field of Classification Search

CPC ..... H04W 80/00; H04W 28/06; H04W 28/04; H04W 12/02; H04W 12/12; H04W 52/0229; H04L 9/0637; H04L 2209/80

USPC .................... 380/270; 370/310; 713/151, 160

See application file for complete search history.

(56) References Cited

U.S. PATENT DOCUMENTS

| | | | | |
|---|---|---|---|---|
| 4,617,657 | A * | 10/1986 | Drynan et al. | 370/410 |
| 2007/0263626 | A1 * | 11/2007 | Warden | 370/390 |
| 2007/0291778 | A1 * | 12/2007 | Huang et al. | 370/410 |
| 2010/0014672 | A1 * | 1/2010 | Vialen et al. | 380/270 |

OTHER PUBLICATIONS

Bluetooth SIG, "Specification of the Bluetooth System, vol. 6, Core System Package [Low Energy Controller volume]," Jun. 30, 2010, (136 pages).

* cited by examiner

*Primary Examiner* — Jung Kim
*Assistant Examiner* — Ayoub Alata
(74) *Attorney, Agent, or Firm* — Steven A. Shaw; Frederick J. Telecky, Jr.

(57) ABSTRACT

An expanded sequence number is added to PDUs in a Bluetooth® low energy system. The expanded sequence number provides more accurate identification of the PDUs and allows the system to avoid delaying transmission of PDUs while retransmitting other PDUs. A PDU security sequence number may also be added to the PDUs. The security sequence number is used to create a unique nonce for use in encrypting or decrypting and authenticating the PDU. Using the security sequence number, a failed connection can be reestablished between two devices without the need of generating an encryption key. The security sequence number allows the devices to perform encryption or decryption and authentication using an existing key and a nonce generated from the security sequence number.

18 Claims, 3 Drawing Sheets

METHODS TO IMPROVE BLUETOOTH LOW ENERGY PERFORMANCE

CROSS-REFERENCE TO RELATED APPLICATIONS

This application claims the benefit of the filing date of U.S. Provisional Patent Application No. 61/504,613, which is titled "Methods to Improve Bluetooth Low Energy Performance" and was filed Jul. 5, 2011, the disclosure of which is hereby incorporated by reference herein in its entirety.

BACKGROUND

In the Bluetooth® low energy (BLE) link layer, the header in each data channel protocol data unit (PDU) includes a sequence number (SN) bit and a next expected sequence number (NESN) bit for controlling the sequencing of PDUs exchanged between two devices. The SN bit in a PDU is set by the sending device of the PDU to indicate the sequence number of the PDU being sent. The SN bit value is stored by the device to track the sequence number of the last PDU sent. The SN bit is initialized to 0 by the device upon entering the connection state. The SN bit is changed (from 0 to 1 or vice versa) for each new PDU sent by the device, but is not changed when a PDU is resent by the device.

The NESN is set to indicate the sequence number of the next expected PDU. The NESN is initialized to 0 by a device before receiving a PDU in the connection state. The NESN value is stored by the device to track the sequence number of the next expected PDU. The NESN is changed (from 0 to 1 or vice versa) upon receiving an expected PDU, i.e., when a PDU is received with a valid cyclic redundancy check (CRC) and with an SN equal to the NESN currently stored on the device, but remains unchanged upon failing to receive an expected PDU, i.e., when a PDU is received with an invalid CRC or with an SN that is not equal to the NESN currently stored on the device.

Data PDUs are transmitted by a sender and acknowledged by a receiver. If a data PDU is not positively acknowledged by the receiver, then the data PDU will be retransmitted by the sender until a positive acknowledgement is received. Retransmissions of a PDU may take relatively long time. BLE has a short preamble, and its access address and PDU are uncoded. The probability of PDU reception failure due to erred access address or CRC, for example, is approximately thirty percent. PDU reception failure may occur in either direction, which effectively doubles the PDU failure rate. Also, because the SN and NESN are each only one bit long, failure to receive two expected data or acknowledgement PDUs in a row may not be detected by the receiving device.

PDUs are retransmitted by the sender until a positive acknowledgement is received, which can lead to excessive retransmissions of time-sensitive data. This can result in the meaningless transmission of old data. When the recipient eventually receives these aged PDUs, it will unknowingly treat the PDUs as containing timely information.

Additionally, while waiting for a proper acknowledgement of previously sent PDUs, the excessive retransmission of the old PDUs holds up timely transmission of new PDUs. By the time the new PDUs are finally transmitted—after waiting for an old PDU to be acknowledged, for example—the new PDUs will be aged too. BLE is prone to packet reception failures, and hence excessive retransmissions of PDUs result in the reception of aged information and the delay of new data.

The current one-bit sequence number does not allow the sender to discard packets in the retransmission process. Discarding a PDU by the sender leads to another packet being discarded by the recipient—without the knowledge of both the sender and recipient. If encryption is enabled, discarding a PDU at the sender leads to invalid message integrity code (MIC) at the recipient, causing unnecessary loss of the connection and suspicion of security attacks. BLE's current reliance on a packet counter to do implicit counting of received PDUs also does not allow the sender to discard packets in the retransmission process as a result different packet counter values may be derived at the sender and the recipient.

The BLE system and the operation of the sequence number (SN), connection formation, and encryption is described in the "Specification of the Bluetooth System, Specification Volume 6, Core System Package [Low Energy Controller volume]," dated Jun. 30, 2010 and published by the Promoter Members of Bluetooth SIG, Inc., ("the Bluetooth Low Energy Controller specification"), the disclosure of which is hereby incorporated by reference herein in its entirety.

SUMMARY

Embodiments of the invention provide improvements to the current one-bit sequence number and implicit packet counter value used in BLE. The current data channel PDU header has six bits that are reserved for future use. Two of the reserved bits may be used to increase the sequence number to three bits. Three of the reserved bits may be used to communicate the three low-order bits (LSBs) of a thirty-nine-bit packet counter. Alternatively, an expanded sequence number and security sequence number may share same three bits.

BRIEF DESCRIPTION OF THE DRAWINGS

Figure 1:
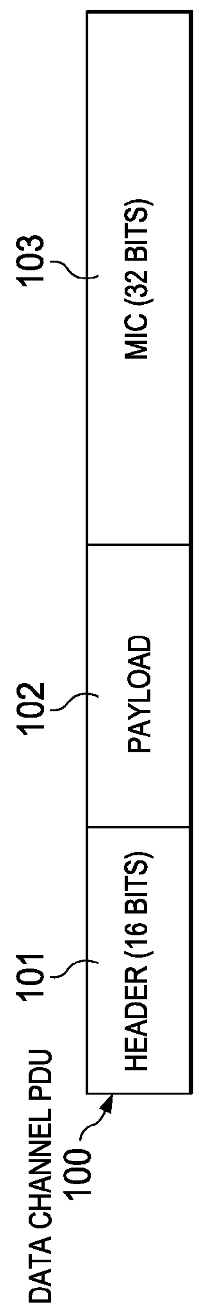

Having thus described the invention in general terms, reference will now be made to the accompanying drawings, wherein:

FIG. 1 illustrates a data channel PDU that is exchanged between a source device and a recipient device according to one embodiment.

Figure 2:
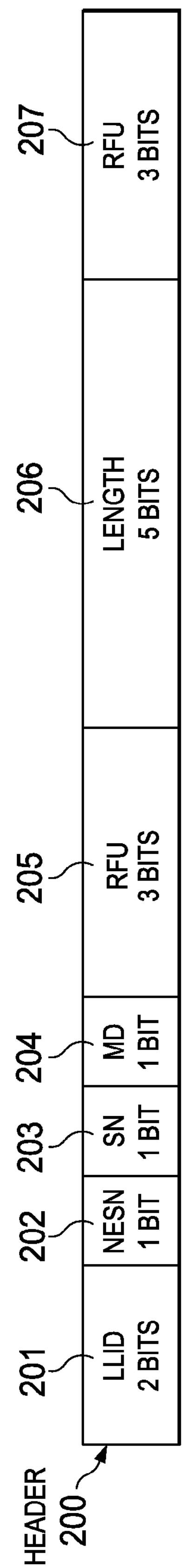

FIG. 2 illustrates the sub-fields of a sixteen-bit header of a data channel PDU according to one embodiment.

Figure 3:
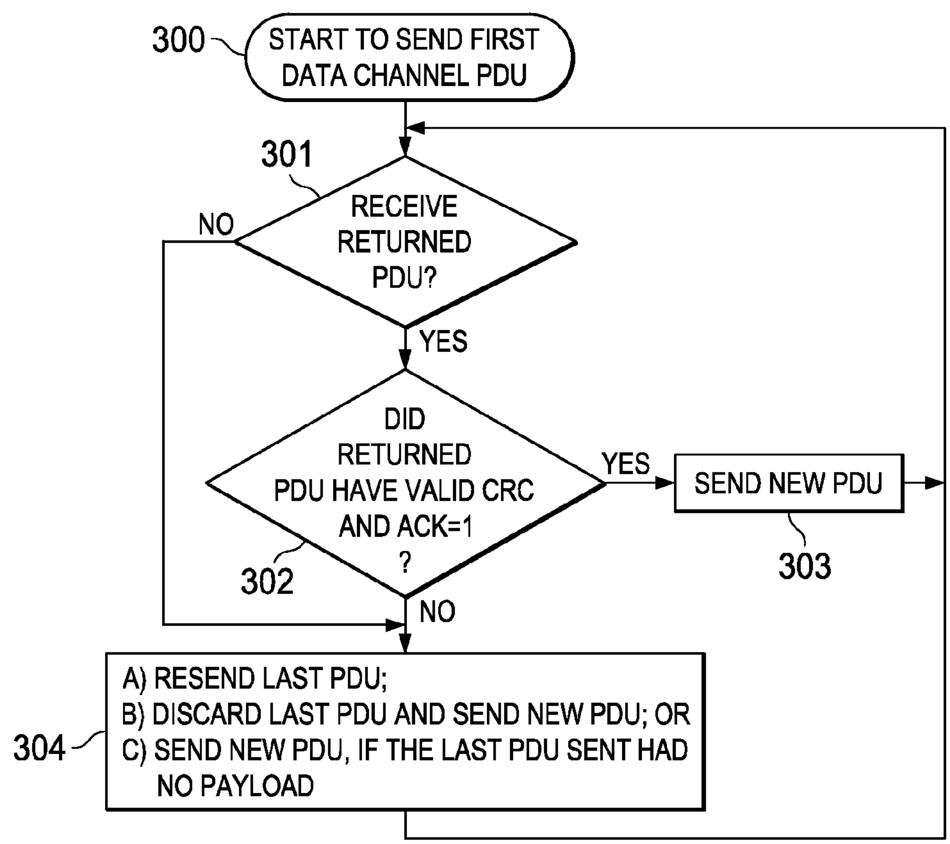

FIG. 3 illustrates a revised operation of a source device to incorporate an expanded sequence number.

Figure 4:
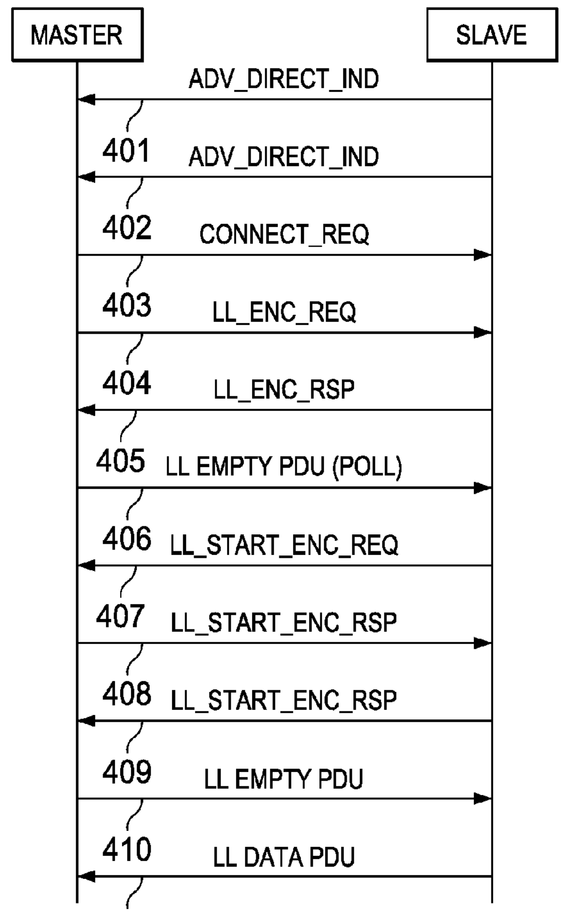

FIG. 4 illustrates the PDUs that must be exchanged between a master device and a slave device to establish a connection in current systems.

Figure 5:
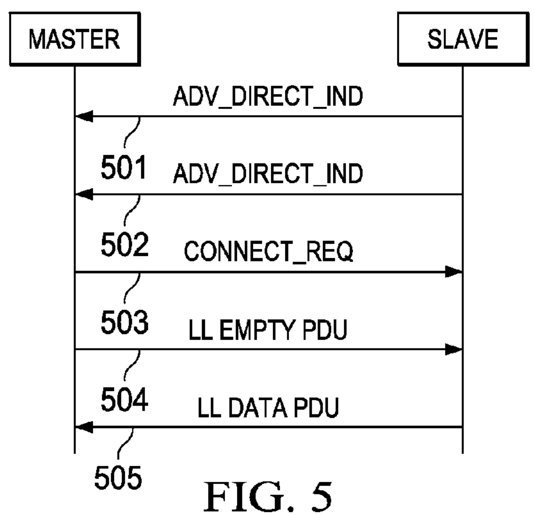

FIG. 5 illustrates the PDUs exchanged to recreate a connection between two devices that have already established encryption keys.

Figure 6:
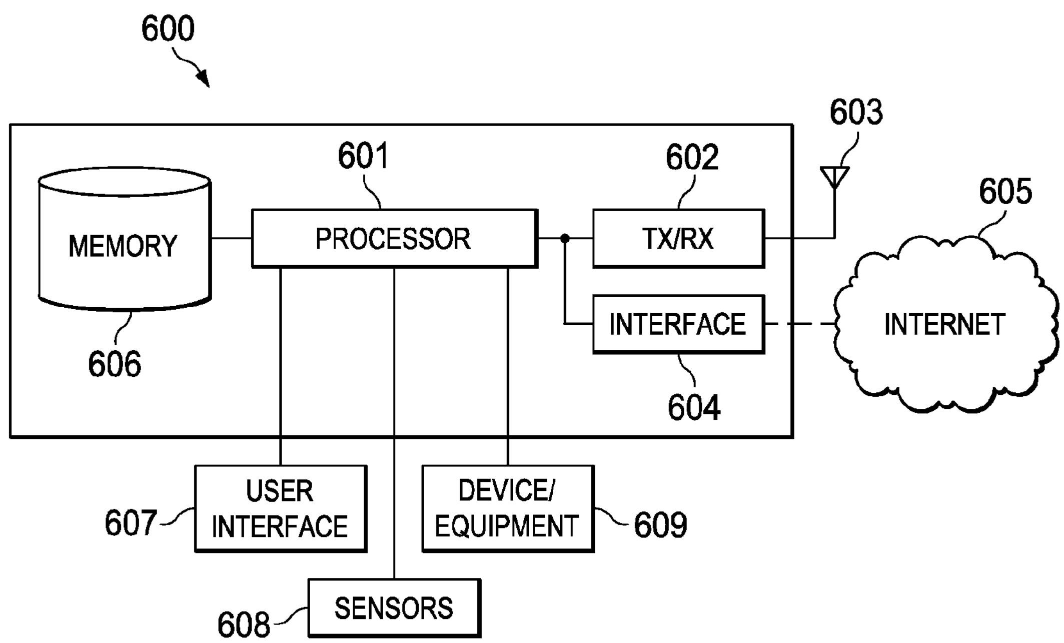

FIG. 6 is a block diagram of an exemplary embodiment of a device adapted to implement embodiments of the invention.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 illustrates a data channel PDU 100 that is exchanged between a source device and a recipient device according to one embodiment. PDU 100 comprises a sixteen-bit header field 101, a payload field 102, and a message integrity check (MIC) field 103.

FIG. 2 illustrates the sub-fields of a sixteen-bit header 200 of a data channel PDU 100 according to one embodiment. Header 200 comprises link layer ID (LLID) field 201, one-bit NESN field 202, one-bit SN field 203, more data (MD) field 204, length field 206, and two reserved future use (RFU) fields 205, 207. SN field 203 is set to indicate the sequence number of this PDU, and NESN field 202 is set to indicate the sequence number of next expected PDU. The one-bit SN and NESN fields in existing systems are cycled between 0 and 1 for each new PDU, which provides only two unique sequence numbers.

In one embodiment, the sequence number for a BLE PDU is expanded beyond one bit. This enables the BLE system to provide more than two sequence numbers. As shown, in FIG. 2, existing SN field 203 is only one-bit wide; however, some or all of the bits in the RFU fields 205, 207 may be used to support an expanded sequence number. For example, the sequence number may be expanded from one bit to three bits, which would provide eight unique sequence numbers. This would require one bit from SN field 203 and two bits from RFU fields 205, 207. Alternatively, one of the RFU fields 205, 207 may be used to hold the three-bit sequence number and SN field 203 may be unused, set to a default value, or ignored. Although a three-bit expanded sequence number is described herein, it will be understood that a sequence number of a different length can be used. A sequence number may comprise bits from the SN field 203 and/or RFU fields 205, 207, which would allow up to seven sequence number bits in header 200. In other embodiments, additional sequence number bits may be carried in the PDU (i.e., expanded beyond seven bits) by using bits in the PDU payload following the header field. For example, bits in payload 102 as well as header 101 (FIG. 1) may be used to carry the sequence number in one embodiment.

The expanded sequence number is maintained by the source device to track the sequence number of the last non-empty PDU that it sent. The receiving device maintains the expanded sequence number of the last non-empty PDU that it received with a valid CRC. When the source and recipient devices enter a connection state, the expanded sequence number is initialized to zero (e.g., 0 if its length is 3 bits) by the source device and to the maximum value (e.g., 7 if its length is 3 bits) by the receiving device. The expanded sequence number is then incremented by one for each new non-empty PDU sent by the source to the recipient. The expanded sequence number is wrapped around to zero when it is incremented from its maximum value. The expanded sequence number is unchanged for a resent PDU and is not applied to empty PDUs (i.e., PDUs with no payload).

When the expanded sequence number is used, the NESN bit is redefined as an acknowledgement (Ack) bit. In this embodiment, the NESN (or Ack) bit is set to 0 when the last PDU was received with an invalid CRC or when an expected PDU was not received. The NESN bit is set to one if the last expected PDU was received with a valid CRC.

The operation of the source device is revised as illustrated in FIG. 3 to incorporate the expanded sequence number. Starting at 300 to send its first data channel PDU upon entering the connection state, the source device moves to step 301 to determine if a PDU was returned from the recipient device. If the source did receive a returned PDU, the operation moves to step 302. In step 302, the source device determines if the returned PDU from the recipient device was received with a valid CRC and the NESN bit (i.e., the Ack bit) set to 1. If the returned PDU had a valid CRC and the Ack=1, then the source device sends a new PDU in step 303 and returns to wait for the next returned PDU from the recipient device.

If, in step 302, the returned PDU from recipient was received with a valid CRC, but with the NESN bit (i.e., the Ack bit) set to 0, or if the returned PDU was received with an invalid CRC, then the source device moves to step 304. Depending upon the status of the last PDU sent, the source device performs one of three actions in step 304: (a) resends its last PDU, (b) discards its last PDU and sends a new PDU, or (c) sends a new PDU if its last PDU had no payload.

In step 301, if no PDU from the recipient was received, then the source device acts as if a returned PDU was received with invalid CRC and the operation moves to step 304. After the appropriate PDU is sent in step 304, the operation moves back to await another returned PDU.

In BLE, the Link Layer provides encryption and authentication using Counter mode for encryption and Cipher block chaining for Message authentication (CCM). CCM uses a temporal key (also called encryption key) to do the message encryption and authentication. It requires a unique nonce value for each data channel PDU protected by a given temporal key. In an encrypted and authenticated connection, all of the data channel PDUs with a non-zero length payload are encrypted and authenticated. Authentication is performed by appending a message integrity check field (e.g., MIC field 103, FIG. 1) to the payload. The MIC is calculated over the PDU's payload field and the first octet of the header with the NESN, SN and MD bits masked to zero. Encryption is applied to the PDU's payload field and MIC.

The CCM algorithm requires the payload and some additional parameters to be formatted into the CCM nonce, counter-mode blocks and encryption/authentication blocks. The CCM nonce provides uniqueness to each packet. The CCM nonce is constructed from a thirty-nine-bit packet counter, one-bit direction bit, and an eight-octet initialization vector (IV). In existing systems, the packet counter is set to zero for the first encrypted PDU sent during an encryption start procedure. The packet counter is then incremented by one for each new PDU that is encrypted. The packet counter is not incremented for retransmissions.

The CCM nonce used to encrypt/authenticate a PDU must be the same CCM nonce used to decrypt/authenticate the PDU. Accordingly, it is critical to maintain the same packet counter on the sender device and the receiver device. However, in existing systems, if a receiving device misses one PDU from a sending device but accepts a later-sent PDU, then it is possible that the sending and receiving device will have different packet counter values due to the missed PDU, which would cause the receiver to miss a packet counter increment. As a result, a device may reject valid PDUs, because the packet counters are no longer coordinated and hence the MIC computed by the receiver does not match with the MIC sent by the sender. Invalid MIC will cause the receiving device to disconnect from the sender. The devices will then need to establish a new connection and a new encryption resetting the packet counter to zero to exchange PDUs.

A connection between two BLE devices may breakdown if valid packets are not received within a supervision timeout interval. This may occur, for example, if the devices are out of range, encounter interference, or suffer a power failure. However, other situations may inadvertently cause the connection between two devices to be disconnected when no problem exists. In a low duty cycle operation, a device may not send PDUs frequently enough to keep the connection alive. For example, if the duty cycle triggering PDUs is greater than the supervision timeout interval, then the connection will eventually be considered lost due to supervision timeout.

Whenever a connection is lost, the devices must recreate a new connection to send new data PDUs. FIG. 4 illustrates the PDUs that must be exchanged between a master device and a slave device to establish a connection in current systems. The slave device sends two directed advertising event (ADV_DIRECT_IND) PDUs 401, 402 that comprise the addresses for the master and slave devices desired for the connection. The master device then sends a connection request (CONNECT_REQ) PDU 403. The devices exchange initialization vector (IV) and session key diversifier (SKDm) parameters in link layer encryption request (LL_ENC_REQ) PDU 404 and link layer encryption response (LL_ENC_RES) PDU 405. After the IV and SKDm parameters are exchanged, the master sends an empty link layer data PDU 406.

The devices then begin encryption on the connection with a three way handshake using link layer start encryption request (LL_START_ENC_REQ) and link layer start encryption response (LL_START_ENC_RSP) PDUs 407-409. The master sends an empty PDU 410, which the slave responds to with a data PDU 411. At this point, the devices can exchange encrypted PDUs as long as the correct packet counters are used and the PDUs are sent within the supervision timeout interval for the connection.

The deficiencies noted above are addressed in one embodiment by adding a security sequence number (SSN) to the PDU header or between the header and payload for encrypted PDUs. For example, the SSN may be carried using RFU bits 205, 207 (FIG. 2) or other bits in payload 102 (FIG. 1). The SSN may be any length that can be carried in the PDU. For example, in on embodiment, the SSN is L-bits long, where $2 \leq L \leq 8$.

The SSN is included in every non-empty encrypted PDU, but not in empty PDUs. The SSN is maintained by the source device to track the SSN of the last non-empty PDU that it sent. The SSN is maintained by the recipient device to remember the SSN of the last non-empty PDU it received with a valid CRC and MIC.

Upon starting encryption of PDUs between the devices, the SSN value is initialized to 1 by the source device and to 0 by the recipient device. The SSN is incremented by one for each new encrypted PDU sent by the source device to the recipient device and is wrapped around to zero after it is incremented from its maximum value. The SSN is unchanged for a resent PDU.

The SSN can be used to create a redefined packet counter for the CCM nonce. The new packet counter comprises the SSN as the least significant bits (LSBs) and an Internal Higher Order (IHO) as the most significant bits (MSBs). The SSN is L-bits long and the IHO is 39-L bits long so that the overall refined packet counter is still thirty-nine-bits long. The SSN in the refined packet counter is the SSN of current packet as discussed above.

The IHO is initially set to zero and remains zero if the SSN of the packets secured with the same key and transmitted from the same sender to the same recipient has never wrapped around. The IHO is incremented by one each time the SSN of the packets secured with the same key and transmitted from the same sender to the same recipient wraps around. This wraparound is apparent, for example, if the SSN of the current packet is smaller than or equal to that of the last packet secured with the same key, containing a valid MIC value, and transmitted by the same sender.

When the SSN is exchanged in the PDUs, the process for recreating a connection between two devices can be shortened significantly. FIG. 5 illustrates the PDUs exchanged to recreate a connection between two devices that have already established an encryption key. The slave device sends two directed advertising event (ADV_DIRECT_IND) PDUs 501, 502 that comprise the addresses for the master and slave devices desired for the connection. The master device then sends a connection request (CONNECT_REQ) PDU 503. Because the devices have the SSN, they can skip the encryption messages required in FIG. 4 and instead jump to PDUs 504 and 505. Using the SSN exchanged in each PDU, the devices can create the redefined packet counter (e.g. packet counter=IHO+SSN) for that PDU. Once the refined packet counter is determined, the unique CCM nonce required to encrypt and decrypt the PDU can be generated.

Accordingly, when a connection between two devices is dropped due to discarded packets or elapsed supervision timeout interval, the devices still have a valid encryption key. This existing encryption key can continue in use and the connection between the devices can be regenerated quickly using the SSN and the process shown in FIG. 5, which is less than half as long as the current process for regenerating a connection as shown in FIG. 4.

In an alternative embodiment, the expanded sequence number and security sequence number improvement can be combined. For example, the current SN field (203) bit and two bits in the first RFU field (205) in the data channel PDU header may be used as both a three-bit expanded sequence number (SN) and an L-bit security sequence number (SSN), where L=3. Using this three-bit number, both the protocol and security sequences will work as specified above. The combined expanded SN and SSN is set as if it were a sequence number at the source device. The combined expanded SN and SSN is always interpreted as a sequence number and is interpreted as an SSN as well if the PDU is encrypted.

The combined expanded SN and SSN is initialized to zero by the source device, and to its maximum value by the recipient device upon entering the connection state the first time. However, the combined expanded SN and SSN is not initialized again when the devices reenter the connection state. Instead, the value is preserved after a connection loss and a reconnection, which allows the devices to continue decrypting PDUs using the correct CCM nonce for each PDU.

The improvements described herein are backward compatible with existing BLE systems. For example, in the feature exchange procedure, the master may indicate its support for the improved feature in its link layer feature request (LL_FEATURE_REQ) PDU. The slave may indicate its support for the improved feature in its link layer feature response (LL_FEATURE_RSP) PDU. The two devices may then compose and/or parse the header fields of the data channel PDUs they exchange according to the expanded SN and SSN as specified for the improved features. The devices process the expanded sequence number and security sequence number as described above.

Replay defense is provided by requiring a recipient to discard any received packets that could or would otherwise result in its IHO value wrapping around to zero. In particular, if a recipient currently has an IHO equal to $2^{(39-L)}-1$ for secured packets transmitted by a sender, then the recipient shall discard any received packets containing a SSN smaller than or equal to the SSN of the last secured packet containing a valid MIC value and transmitted by the same sender.

FIG. 6 is a block diagram of an exemplary embodiment of a device 600 adapted to implement embodiments of the invention. Device 600 may be used as a master or slave device and/or a sending or receiving device in a BLE system. Processor 601 processes data exchanged with other BLE devices via transceiver 602 and antenna 603. Device 600 may access the Internet or other network 605 via wired interface 604. Processor 601 may be a software, firmware, or hardware based device or a combination thereof. Processor 601 may also generate and process messages sent to, and received from, another device, such as data channel PDUs as described herein.

Memory 606 may be used to store expanded sequence numbers, security sequence numbers, packet counter, CCM nonce, and other parameters used in a BLE system. Memory 606 may also be used to store computer program instructions, software and firmware used by processor 601. It will be understood that memory 606 may be any applicable storage device, such as a fixed or removable RAM, ROM, flash memory, or disc drive that is separate from or integral to processor 601.

Device 600 may be coupled to other devices, such as user interface 607, sensors 608, or other devices or equipment 609. Sensors 608 may be used, for example, to monitor environmental or physical conditions or mechanical or electrical states of a device or equipment 609.

Many of the functions described herein may be implemented in hardware, software, and/or firmware, and/or any combination thereof. When implemented in software, code segments perform the necessary tasks or steps. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

The software code segments may be stored in any volatile or non-volatile storage device, such as a hard drive, flash memory, solid state memory, optical disk, CD, DVD, computer program product, or other memory device, that provides computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method, comprising:

in a device adapted to communicate using a Bluetooth low energy link layer, maintaining a protocol data unit (PDU) sequence number that has a size greater than one bit;

initializing the PDU sequence number to zero if the device is a source device;

incrementing the PDU sequence number by one when a new PDU is sent by the source device;

setting an acknowledgement bit in a returned PDU to zero if a last received PDU contained errors; and setting the acknowledgement bit to one if a last expected PDU was received without errors, wherein bits comprising the PDU sequence number are represented at least in part by bits of a field reserved for future use in a Bluetooth Low Energy Controller specification, and wherein a bit comprising the acknowledgement bit is represented by a next expected sequence number field in the said specification.

2. The method of claim 1, further comprising:

setting the PDU sequence number to zero if the PDU sequence number is at a maximum value and the PDU sequence number is incremented.

3. The method of claim 1, further comprising:

maintaining a current PDU sequence number value when a PDU is resent by the source device.

4. The method of claim 1, further comprising:

set an acknowledgement bit in a returned PDU to zero if a last expected PDU was not received.

5. The method of claim 1, further comprising:

determining if a PDU was returned from a recipient without errors and with an acknowledgement of a previously sent PDU; and sending a new PDU to the recipient.

6. The method of claim 1, further comprising:

determining if a returned PDU was received from a recipient with errors or without an acknowledgment of a previously sent PDU, or if an expected returned PDU was not received from a recipient; and resending the previously sent PDU.

7. A method, comprising:

in a device adapted to communicate using a Bluetooth low energy link layer, maintaining a protocol data unit (PDU) security sequence number that has a size greater than two bits;

upon starting generation of encrypted PDUs, initializing the PDU security sequence number to one if the device is a source device and initializing the PDU security sequence number to zero if the device is a recipient device; and incrementing the PDU security sequence number by one for each new encrypted PDU sent by the source device, wherein bits comprising the PDU security sequence number are represented at least in part by bits of a field reserved for future use in a Bluetooth Low Energy Controller specification.

8. The method of claim 7, further comprising:

setting the PDU security sequence number to zero if the PDU security sequence number is at the maximum value and the PDU security sequence number is incremented.

9. The method of claim 7, further comprising:

maintaining a current PDU security sequence number value when a PDU is resent by the source device.

10. The method of claim 7, further comprising:

inserting the PDU security sequence number in non-empty encrypted PDUs prior to transmission.

11. The method of claim 7, further comprising:

generating a nonce for use in encrypting a PDU, the nonce comprising at least in part the current PDU security sequence number maintained by the device.

12. The method of claim 7, further comprising:

generating a nonce for use in decrypting a received PDU, the nonce comprising at least in part the PDU security sequence number extracted from the received PDU.

13. A method, comprising:

in a device adapted to communicate using a Bluetooth low energy link layer, maintaining a protocol data unit (PDU) security sequence number that has a size greater than two bits;

upon starting generation of encrypted PDUs, initializing the PDU security sequence number to one if the device is a source device and initializing the PDU security sequence number to zero if the device is a recipient device;

incrementing the PDU security sequence number by one for each new encrypted PDU sent by the source device; and generating a nonce for use in encrypting PDUs, the nonce comprising a combination of a PDU security sequence number and an internal higher order number, wherein the internal higher order number indicates a number of times that the PDU security sequence number has wrapped around since an encryption key was established.

14. A method, comprising:

in a device adapted to communicate using a Bluetooth low energy link layer, generating a protocol data unit (PDU) comprising a variable that has a size greater than two bits, the variable representing both a PDU sequence number and a PDU security sequence number, the PDU sequence number indicating the PDU's position in a sequence of PDUs; and encrypting the PDU using a nonce created with the PDU security sequence number, the nonce comprising a combination of a PDU security sequence number and an internal higher order number, wherein the internal higher order number indicates a number of times that the PDU security sequence number has wrapped around since an encryption key was established.

15. The method of claim 14, further comprising:

initializing the variable to one by a source device upon entering a connection with a recipient device, and initializing the variable to zero by the recipient device upon entering a connection with the source device; and incrementing the variable by the source device after the PDU is sent to the recipient device.

16. The method of claim 15, further comprising:

detecting that the connection to the recipient or source device has failed; preserving a current value of the variable;

establishing a new connection to the recipient or source device; and encrypting and sending a new PDU to the recipient device, and receiving and decrypting the new PDU from the source device, using the current value of the variable.

17. The method of claim 16, further comprising:

establishing the new connection to the source or recipient device without generating a new encryption key; and encrypting or decrypting PDUs sent to the recipient device or received from the source device using an encryption key generated for the connection that failed.

18. A device, comprising:

a circuit for sending signals to and receiving signals from another device using a Bluetooth low energy link layer;

a memory for storing protocol data unit (PDU) parameters; and a processor adapted to perform operations on the signals sent to or received from the other device, the processor operating to:

store a PDU sequence number to the memory, the PDU sequence number having a size greater than one bit;

initialize the PDU sequence number to zero if the device is a source device;

increment the PDU sequence number by one when a new PDU is sent by the source device;

set the PDU sequence number to zero if the PDU sequence number is at a maximum value and the PDU sequence number is incremented;

generate a PDU comprising a variable that has a size greater than two bits, the variable representing both the PDU sequence number and a PDU security sequence number, the PDU sequence number indicating the PDU's position in a sequence of PDUs; and encrypt the PDU using a nonce created with the PDU security sequence number.

* * * * *